United States Patent Office 3,159,615
Patented Dec. 1, 1964

3,159,615
POLYMERIZATION OF OLEFINS IN THE PRESENCE OF A ZIEGLER TYPE CATALYST PLUS A SURFACTANT
Lloyd E. Weeks, Creve Coeur, and Robert J. McManimie, Glendale, Mo., assignors to Monsanto Company, a corporation of Delaware
No Drawing. Original application Dec. 19, 1957, Ser. No. 703,766, now Patent No. 3,060,132, dated Oct. 23, 1962. Divided and this application Mar. 26, 1962, Ser. No. 182,662
6 Claims. (Cl. 260—94.9)

This invention relates to the use of Ziegler catalysts to effect chemical reactions, especially polymerizations. In certain preferred aspects the invention pertains to the production of high-density polyethylene by polymerizing ethylene in the presence of a catalyst exemplified by the material obtained by the interaction of a trialkylaluminum with titanium tetrachloride, said catalyst having been especially treated to ameliorate the effects of aging of said catalyst.

STORAGE OF ZIEGLER CATALYSTS

Ziegler catalysts, for whatever use desired, can be prepared in the vessel in which the catalyzed reaction is to be carried out, or can be prepared in one vessel and then transferred to the intended reaction vessel, and in either event can either be used immediately after preparation, or after a period of time elapses between the preparation of the catalyst and its subsequent use to catalyze, e.g., polymerization. There are certain practical advantages in preparing a considerable quantity of a Ziegler catalyst and then storing same and using the stored catalyst as a stock from which to draw portions thereof for use in a series of batch reactions or over an extended period of time in a continuous reaction. Not only is the number of catalyst preparations minimized, but uniformity in the ratio of the materials going into making the Ziegler catalyst is thus assured. Further, in effecting Ziegler polymerizations, it has been found that preparation of the catalyst in the vessel in which the polymerization is to be conducted tends to result in more severe "planting" of polymer on the surfaces of the reaction vessel, heat exchange surfaces within the vessel, stirrers and the like, than occurs when the catalyst is first prepared in a separate vessel and then a portion or all of the catalyst is transferred into the polymerization vessel for use.

However, Ziegler catalysts on standing, i.e., during storage, tend to undergo certain changes, the nature of which is not well understood, but which result in various disadvantages. Possibly the most undesirable effect of storing or "aging" Ziegler catalysts is loss of catalytic activity. Thus, Ziegler catalyst allowed to stand at room temperature for one day prior to its use is found to have a significantly lower activity, as measured, for instance, by the weight of monomer, e.g., ethylene, whose polymerization can be effected by a given weight of the catalyst in a given period of time, than the same catalyst if used immediately after preparation. The loss in catalyst activity continues to be more severe if the storage period is extended. The lessened activity is noted not only in polymerizations but also in other reactions catalyzed by Ziegler catalysts.

Another important effect of aging Ziegler polymerization catalysts is that the longer the aging period, the higher the molecular weight of the resulting polymer, as reflected by specific viscosity and flowability, e.g., melt index. While in some instances it will be desired to obtain an increased molecular weight by deliberately aging the catalyst, in most instances it is difficult to obtain a polymer of sufficiently low molecular weight to have desirable flow properties and; hence, in these cases, aging of catalyst is a marked disadvantage.

SUMMARY OF INVENTION

The essence of the present invention lies in the use of nonionic surfactants to prevent or overcove the loss of activity that normally occurs on aging, i.e., storage, of Ziegler catalysts. In one embodiment of the invention, a nonionic surfactant is added to a fresh Ziegler catalyst, i.e., is added to a Ziegler catalyst immediately after or very shortly after its preparation; after a period of storage the thus-treated catalyst is more active than it would have been had the surfactant not been added and the catalyst stored under the same conditions for the same time. Thus, the aged catalyst has been enhanced in activity by practice of the invention. In another embodiment, Ziegler catalyst that has been stored for such times and under such conditions that it is of less activity than when fresh is enhanced in activity by adding thereto a nonionic surfactant. The uses of nonionic surfactant also make it possible to obtain the desired lower molecular weight range of polymers over longer periods of time and with older catalysts than could otherwise be employed for this purpose.

The invention is not dependent on any particular theory that might be advanced to explain these phenomena. It may be noted that both cationic and anionic surfactants have been tried but found incapable of obtaining these results; the invention is of general application to nonionic surfactants. Furthermore, addition of the nonionic surfactant to either of the components, for example, trialkylaluminum or TiCl$_4$, used in preparing Ziegler catalyst, is ineffective—rather, the surfactant must be added to the catalyst after it has been prepared.

ZIEGLER-TYPE CATALYSTS

There has recently come into commercial prominence the polymerization of ethylene and other monomers through the agency of a type of catalyst advanced by Prof. Dr. Karl Ziegler of the Max Planck Institute at Mulheim, Ruhr, Germany. In general, Ziegler catalysts can be obtained by treating a salt or oxide of a metal of Group IV–B, V–B, VI–B, VII or VIII, with a metal of Group I, II or III in metallic, hydride, or organometallic form. Naturally, the production of an active catalyst will be considerably dependent on the choice of these components, their proportions, and the manner in which they may be combined. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of Group IV–B, V–B, or VI–B of the Periodic System, including thorium and uranium, and especially compounds of titanium, zirconium and chromium. These, and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,362, in various ways, for example, as follows. Instead of or in addition to the aluminum trialkyls, catalysts of the type described in the Belgian patent can be made by reacting the various metal compounds of Groups IV–B, V–B and VI–B disclosed therein with aluminum compounds of the general formula, $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organo-aluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being reacted with compounds of Groups IV–B, V–B or VI–B metals. Another Ziegler-type catalyst is prepared by the interaction of an aluminum compounds of the general formula, $R_2AlX$, where R is a hydrocarbon radical such as alkyl or aryl, and X is a halogen, such as chlorine or bromine, with a compound of a metal of Group VIII of the Periodic System, e.g., iron, nickel, cobalt, or platinum, or manganese, for example, dimethylaluminum monobromide plus ferric chloride, diisobutylaluminum chloride plus nickel (trivalent) chloride, diethylaluminum monochloride plus maganic chloride. Yet another combination is that of the Group IV–B, V–B or VI–B metal compounds with aluminum compounds of the general formula $R_2AlX$, where R is hydrogen or a hydrocarbon radical, and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler-type polymerization catalysts comprises compounds of the Group IV–B, V–B and VI–B heavy metals as previously mentioned, combined with the alkali metal alkyls, for example, with lithum-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example, butyl lithium plus zirconium tetrachloride, sodium tetramethylaluminum plus titanium tetrachloride or plus thorium acetylacetonate. Other Ziegler-type catalysts are prepared by using (in conjunction with compounds of Group IV–B, V–B and VI–B metals), instead of trialkylaluminums, triaryl-, triaralkyl, trialkaryl- or mixed alkyl- and aryl-aluminum, zinc, magnesium or alkali metals, e.g., phenyl sodium plus $TiCl_4$.

Those skilled in the art having knowledge of these matters refer to catalysts of the foregoing type as Ziegler or Ziegler-type catalysts; or as Ziegler catalysts adapted for low-pressure polymerization of ethylene or ethylenically unsaturated monomers; and to polymers prepared by their action as Ziegler or Ziegler-type polymers, the terms "Ziegler" and "Ziegler-type" being used synonymously. Ziegler catalysts, of course, are not to be understood as limited to those actually described by Professor Ziegler, any more than, for example, Friedel-Crafts catalysts are limited to those described by Friedel and Crafts; rather, the term Ziegler brings to mind a particular type of catalytic materials, some of which were earlier, and are currently, and no doubt in the future will be, described by persons other than Ziegler and his associates. While the principal classes of such catalysts have been listed, this listing is not to be construed as complete, and various other such catalysts than those set forth may also be used to produce polymers. Thus ethylene and other monomers can be polymerized by catalysts obtained by treating compounds of heavy metals, especially compounds of the Group IV–B, V–B and VI–B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Attention is further directed to the teaching of various of the foregoing catalysts in Ziegler's Belgian Patents 534,792 and 534,888, the disclosure of which are hereby incorporated herein by reference. Still another disclosure incorporated herein by reference is that of Belgian Patent 538,782, issued jointly to Montecatini Societa Generale per L'Industria Mineraria E. Chimica Anonima and Prof. Dr. Karl Ziegler, disclosing the polymerization of olefins having at least 3 carbon atoms in the molecule, and their copolymerization with each other and with ethylene, using a variety of Ziegler catalysts; olefins, especially $\alpha$-olefins, disclosed in said Belgian Patent 538,782 include propylene, butylene, isobutylene, pentylene, hexylene, vinyl cyclohexene and styrene. Substantially, the same disclosure is found in Australian patent application 9651/55 also filed by Montecatini and Ziegler jointly. Catalysts of the said Belgian Patent 538,782 and Australian application 9651/55 are obtained by reaction of compounds of metals of the left-hand column of the 4th to 6th groups of the periodic table of elements, including the thorium and uranium groups, with metals, alloys, metal hydrides, or metal-organic compounds of metals of the 1st to 3rd groups of the periodic table. Yet another disclosure incorporated herein by reference is that of Ziegler's Australian patent application 13,453/55, opened to public inspection May 10, 1956 directed to polymerizing ethylene with catalysts comprising mixture of organic compounds of the metals of Groups I to III of the Periodic System of the general formula $R_nMeX$, wherein R represents a hydrocarbon radical; X, a hydrocarbon radical or halogen; Me, a metal of Groups I to III of the Periodic System; and $n$, an integer which is less by one than the valency of the metal Me, with compounds of the metals of Group VIII of the Periodic System or of manganese.

A portion of the Ziegler catalysts can be defined as catalysts comprising mixtures of metals or metal compounds of the 1st to 3rd groups of the periodic chart of the elements with compounds of metals of the 4th to 6th side groups (including thorium and uranium) of the said periodic chart.

Another group of valuable Ziegler catalysts can be defined as mixtures of organic compounds of metals selected from the group consisting of $R_nMeX$ in which R is hydrocarbon, Me is a 1st to 3rd group metal, X is hydrogen, hydrocarbon or halogen, and $n$ is a number which is lower by 1 than the valence of the metal Me, with a salt of a group IV–B to VI–B metal. The molar proportion of the organic metal compound is ordinarily sufficient to reduce the valence of the group IV–B to VI–B metal at least in part.

Ziegler catalysts can also be defined as including all polyvalent metal compounds in combination with reducing agents, particularly organometals, which are effective to reduce the valence of the polyvalent metal or as compositions containing polyvalent metals in a valence state lower than their maximum state and adapted for the low-pressure polymerization of ethylene so that when suspended in a concentration of about 20 mmoles/liter (based on polyvalent metal) in a well-agitated inert solvent, it will cause an ethylene uptake rate of at least 5 grams per hour per liter of solvent.

It will be seen from the foregoing that a large variety of materials can be employed in the formation of a Ziegler catalyst. It is generally considered that the Ziegler catalysts are best obtained by interaction of a polyvalent metal compound with another metal in elemental or combined form resulting in reduction of the valence state of the first said metal. The polymetal Ziegler catalyst is believed to act as a heterogeneous catalyst, i.e., at least some of the product obtained by the interaction of the materials in question is present in solid form although often in such finely divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular Ziegler-type catalyst employed but rather in the treatment of such catalyst with a nonionic surfactant with consequent advantages when used to catalyze a variety of chemical reactions, polymerization of ethylenically unsaturated monomers being of particular interest.

ZIEGLER REACTIONS AND POLYMERS

Ziegler catalysts can be employed to catalyze a variety of chemical reactions, for example, the chlorination of benzene to produce mono- and polychlorobenzenes, especially ortho- and para-dichlorobenzene. The reaction of most intense commercial interest at the present time is polymerization. The present invention is broadly applicable to all Ziegler catalyst, and their use in all chemical reactions catalyzed thereby, and, insofar as polymerization is concerned, is broadly applicable to all Ziegler-type polymers, i.e., all polymers prepared by polymerizing a monomer or mixture of monomers in the presence of a Ziegler-type catalyst. A monomer which can be so polymerized can properly be called a Ziegler-polymerizable monomer. Of especial interest, of course, are those Ziegler solid polymers of sufficiently high molecular weight to be useful in the plastics industry, but benefits of the invention are obtainable in preparing lower molecular weight Ziegler semi-solid and even liquid polymers which can be used, for example, in adhesives, as lube oil additives, etc. The preferred polymers have a molecular weight of at least 2,000 and preferably 10,000. Those Ziegler polymers to which the preparation of the present invention is applied with particular advantage generally have much higher molecular weights ranging from 20,000 to 50,000 or 100,000 and even, in many cases, as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941) and the Journal of the American Chemical Society, 73, page 1901 (1951).

At the present time, ethylene is the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler-type catalysts are also of great interest, having exceptionally low temperature properties, as disclosed in the copending applicaton of Robert J. Slocombe, Serial No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, vinylnaphthalene, vinyl aromatic hydrocarbons generally etc. Styrene when polymerized in the presence of Ziegler-type catalysts gives a high molecular weight polymer showing a crystalline structure by X-ray diffraction examination. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Serial No. 507,717, filed May 11, 1955. A variety of copolymers of the various monomers named above with each other and with other comonomers can be prepared by Ziegler catalysis, and the present invention in its broadest scope includes all such and, in fact, all polymers prepared through the agency of Ziegler-type catalysts on any single monomer or mixture of monomers polymerizable with such catalysts.

Despite the broad scope of the invention, it will be found more convenient in most of the present application to discuss the invention with specific reference to preferred embodiments thereof, and, accordingly, Ziegler-type polyethylene will be especially referred to by way of example. Likewise referred to especially by way of example will be catalysts prepared by the interaction of a trialkylaluminum with titanium tetrachloride, this being the preferred example of the preferred group of Ziegler catalysts which are those prepared by interaction of ($a$) an aluminum compound of the general formula $R_2AlX$ wherein R is an alkyl, cycloalkyl or aryl radical and X is hydrogen, halogen, or an alkyl, cycloalkyl or aryl radical, with ($b$) a metal halide selected from the group consisting of the chlorides, bromides and iodides of titanium and zirconium.

THE INVENTION IN FURTHER DETAIL

In accordance with preferred embodiments of the present invention, an active Ziegler catalyst is prepared, usually but not always as a dispersion in an inert organic liquid; and there is added to such catalyst a nonionic organic surfactant in an amount effective to ameliorate the effect of aging of the catalyst. A suitable amount of surfactant will vary somewhat dependent upon the particular surfactant, catalyst and its age, and the reaction conditions to be employed. In general, the amount of surfactant is in the neighborhood of from .1 to 50 weight percent based on the weight of the catalyst complex, i.e., from .1 to 50 parts by weight surfactant per 100 parts total materials, e.g., trialkylaluminum plus $TiCl_4$ interacted to form the catalyst. It is well to agitate the catalyst vigorously when adding the surfactant in order to achieve intimate contact. The treatment with surfactant is very effectively carried out at room temperature, although elevated temperatures, such as up to 85–90° C., or lowered temperatures, such as down to −70° C. are permissible and are often convenient when the catalyst has been prepared or stored at such temperatures. The weight percent of surfactant on the basis defined above will ordinarily be in the range of 0.1 to 5 or 10 percent. It will be realized that the weight percent of surfactant will usually be a better measure of the modification than will the amount of surfactant calculated on a molar basis. However, it can be said that it will seldom be desirable to use more than 0.3 mole of surfactant per mole of catalyst (based on grammoles of polyvalent metal compound, e.g., $TiCl_4$), and that less than about 0.1 mole of surfactant per mole of catalyst will ordinarily be employed, for example, from 0.001 to 0.1 mole of surfactant per mole of catalyst.

THE SURFACTANTS

The dispersing agents utilized in the present invention to improve the properties of Ziegler-type catalysts are nonionic surfactants. A preferred class of nonionic surfactants for use in the present invention are the polyoxyalkylene compounds, which compounds are characterized by the presence in the molecule of one or more polyoxyalkylene chains, forming the hydrophilic portion, and one or more high molecular weight hydrocarbon radicals, forming the lipophilic portion. Particularly useful are such compounds containing 12 to 22 or more carbon atoms in the lipophilic portion of the molecule and at least two polyoxyethylene groups forming the hydrophilic portion. The polyoxyethylene portion can be connected to the hydrocarbon portion through a carboxyl group (as where the hydrocarbon radical is in a long chain acyl group), an ether linkage (as where the hydrocarbon radical is in the residue of a long chain aliphatic alcohol, or an alkylated phenol, or where the hydrocarbon radical is attached through a carboxyl or ether linkage to the residue of a polyhydroxylic compound which, in turn, is linked through oxygen to the polyoxyethylene chain), an amine linkage (as where the hydrocarbon radical is in the residue of a long chain amine), an amide linkage (as where the hydrocarbon radical is in the residue of a long chain fatty acid amide), or a thioether linkage (as where the hydrocarbon radical is in the residue of a long chain mercaptan).

A surface active agent might be considered broadly as including any material capable of materially influencing interfacial forces between insoluble liquids or liquids and solids; in ordinary usage and as employed herein, however, the term "surfactant" is not intended to extend to such materials as bentonite, polyvinyl esters and alcohols, monohydroxylic alcohols, certain alkyd resins, and specialties such as water repellents which are not used industrially to lower surface tension. The nonionic surfactants are materials which do not readily ionize in solution and which gain their hydrophilic character from either polyhydroxylic or polyoxyalkylene residues. Some of the polyoxyalkylene surfactants useful in the present invention can be represented by the formula:

$$RY(Z)_xH$$

in which R is a straight or branched alkyl or alkylphenyl group of 6 to 22 carbon atoms; X is a number from 2 to to 30 representing the average number of oxyalkylene groups in the surfactant molecules; Y is

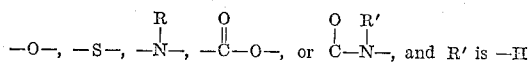

or $(Z)_xH$; Z is $C_2H_4O$, $C_3H_6O$ or $C_4H_8O$. When Z represents ethylene oxide, it is ordinarily preferred that there be about 2 to 20 such groups in the surfactant molecule.

Examples of nonionic surfactants that are effective in modifying Ziegler catalyst are: Sharples nonionic No. 218—a polyethylene glycol tertiary dodecyl thioether containing an average of about 11 oxyethylene groups per molecule, Ipepal CA—an alkyl aryl polyethylene glycol ether which is a condensation product of one mole of tertiary octyl phenol with about 10 moles of ethylene glycol, Pluronic L62—polyoxyethylene-polyoxypropylene condensate, and Sterox CD—a stenol polyoxyethylene ether which is a condensation product of tall oil and about 9 molar equivalents of ethylene oxide. Of course, the number of applicable nonionic surfactants is very large, and it is not practical to give examples of all of them here. However, the nonionic surfactants can be designated by use of the Hydrophile-Lipophile Balance method, abbreviated HLB. The HLB value is a function of the weight percentage of the hydrophilic portion of the molecule of a nonionic surfactant. The HLB values for many nonionic surfactants may be calculated by use of the formulas (William C. Griffin, Journal of the Society of Cosmetic Chemists, vol. V, No. 4, December, 1954).

$$HLB = 20\left(1 - \frac{S}{A}\right) \text{ or } HLB = \frac{E+P}{5}$$

in which S is the saponification number of the ester, A is the acid number of the acid, E is the weight percentage of oxyethylene content, and P is the weight percentage of polyhydric alcohol content. In general, the nonionic surfactants utilized herein will have HLB values from about 2 to about 20. A few such surfactants, together with their HLB values, are set forth below by way of example:

| Trade Name | Chemical Designation | HLB |
|---|---|---|
| Atlas G-1706 | Polyoxyethylene sorbital beeswax derivative. | 2 |
| Span 65 | Sorbitan tristearate | 2.1 |
| Atmul 67 | Glycerol monostearate | 3.8 |
| Span 80 | Sorbitan Monooleate | 4.3 |
| Emcol PL-50 | Propylene glycol fatty acid ester | 4.5 |
| Atlas G-2124 | Diethyleneglycol monolaurate | 6.1 |
| Atlas G-2242 | Polyoxyethylene dioleate | 7.5 |
| Tween 61 | Polyoxyethylene sorbitan monostearate. | 9.6 |
| Atlas G-3763 | Polyoxyethylene fatty amine | 10 |
| Atlas G-3705 | Polyoxyethylene lauryl ether | 10.8 |
| Atlas G-2116 | Polyoxyethylene oxypropylene oleate. | 11 |
| Igepal CA-630 | Polyoxyethylene alkyl phenol | 12.8 |
| Emulphor EL-719 | Polyoxyethylene vegetable oil | 13.3 |
| Atlas G-3720 | Polyoxyethylene stearyl alcohol | 15.3 |
| Tween 40 | Polyoxyethylene sorbitan monopalmitate. | 15.6 |
| Brij 35 | Polyoxyethylene lauryl ether | 16.9 |
| Atlas G-2159 | Polyoxyethylene monostearate | 18.8 |

Nonionic surfactants having HLB values in the range of about 7 to 15 or so are ordinarily very suitable.

A particular group of polyhydric alcohol surfactants which are useful in the present invention are the ditertiary acetylenic glycols, i.e., compounds in which both carbon atoms of an acetylene group are attached to the carbinol carbon atoms of tertiary alcohol moieties; such surfactants under the names, Surfynol 82, Surfynol 102, and Surfynol 104 vary in molecular weight range from about 170 grams to about 230 grams or so.

It will be understood that the enumeration of certain nonionic surfactants herein is not intended to exclude other nonionic surfactants, and that any nonionic surfactants having surfactant properties of the same type as the herein named nonionic surfactants are useful and contemplated as within the present invention.

The condensation products of alkylphenols with ethylene oxide constitute a valuable class of nonionic surfactants for use in the present invention. Ordinarily, such compounds will contain 5 to 10 or 15 moles ethylene oxide per mole of alkylphenol, and the alkyl group will usually contain 5 to 15 or so carbon atoms. This class is exemplified by a dodecylphenol-ethylene oxide in which there is an average of about 7.6 moles ethylene oxide for each mole of phenol.

It will be realized that the nonionic surfactant dispersing agents or dispersants disclosed herein are entirely different from the inert hydrocarbon solvents or suspending agents which are sometimes referred to as dispersants.

While the present invention is not to be limited by any particular theory of its mechanism, it is believed that the nonionic surfactants aid in keeping the catalyst particles dispersed or separated, thereby improving the activity of the catalyst.

The surfactant-modified Ziegler catalysts contemplated herein are, of course, active Ziegler catalysts. Ziegler catalysts which have had their activity destroyed, as by addition of water, for example, or which are otherwise completely deactivated, even after addition of nonionic surfactant, are not contemplated as within the present invention. A Ziegler catalyst can be considered deactivated for most purposes if it is incapable when suspended in a well-agitated inert solvent in concentration of about 20 mmoles/liter (based on the multivalent metal) of causing an ethylene uptake rate of at least 1 gram per hour per liter of reactor space at 20 atmospheres pressure; it is not usually practical to use a catalyst which does not have an uptake rate of at least 10 grams/hour/liter under such circumstances, and it is preferable that the uptake rate be 100 grams/hour/liter or higher.

We ordinarily prefer to prepare an active Ziegler catalyst as a dispersion in an inert organic liquid, such as an aliphatic or aromatic hydrocarbon as will be discussed more in detail hereinafter. This dispersion is ordinarily a colloidal suspension of catalyst particles in the liquid. We then add the chosen nonionic surfactant in the chosen amount, and preferably the surfactant before addition is dissolved or dispersed in an inert organic liquid and the addition made with vigorous agitation so as to prevent localized concentration of surfactant during the treatment of the catalyst therewith. It is necessary to prepare an active Ziegler catalyst first, and then to treat same with the chosen surfactant. Ordinarily, the monomer is polymerized in the presence of the catalyst dispersion which has been treated with the surfactant. However, prior to the polymerization or other use of the catalyst, part or all of the solvent may be removed as by filtration, evaporation, and the like, care being taken not to use conditions for such a separation that will deactivate the catalyst. It is also possible if a dry catalyst, or catalyst in a reduced amount of organic liquid, is to be used, to prepare the active catalyst in such form prior to its treatment with surfactant. In such event, particular care must be taken to insure thorough admixture of the chosen amount of surfactant with the total catalyst, and this can involve using a limited amount of inert organic liquid as a solvent and/or suspending agent for the chosen surfactant, or thorough grinding as by ball milling the catalyst, either in a dry condition or with some inert organic liquid present, with the chosen surfactant.

Ordinarily, it is quite sufficient and, in fact, desirable to use only a single surfactant. However, it is not outside the scope of the invention to utilize an admixture of two or more surfactants or an admixture of any one or more with any other catalyst modifying agent that may be desired.

DETAILS OF PREPARATION AND USE OF ZIEGLER CATALYSTS

More detailed information will now be given on preferred Ziegler catalyst and their preparation, and it will be understood that the procedures given above with respect to use of nonionic surfactants will be followed. We prefer catalysts prepared by the interaction of (a) an aluminum compound of the general formula, $R_2AlX$ wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides and iodides of titanium or zirconium are those represented by the general formula, $R_2AlX$, wherein R is an alkyl, cycloalkyl or aryl radical and X is hydrogen, halogen, or an alkyl, cycloalkyl or aryl radical. By way of example, but not limitation the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di-(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides, or iodides of titanium or of zirconium, the chlorides and iodides being preferred. The titanium or zirconium in these halides should be in a valence form higher than the lowest possible valence. The tetrahalides are especially preferred, although the dihalides, trihalides, mixtures of di-, tri-, and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetone, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and, hence, are more costly and also are usually less active; so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium), can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, n-heptane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, any of the xylenes, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer, e.g., liquid ethylene.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed), per 1 part by weight total polymer produced, solvent recovery steps are obviated or minimized with consequent advantage. It is often helpful in obtaining efficient contact between monomers and catalysts and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are nonsolvents for many of the polymers, e.g., polyethylene, can also properly be termed inert liquid diluents, or inert organic liquids.

The amount of catalyst required is dependent on the other variables of the particular reaction, such as polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should usually be at least about 0.001:1, and much lower values, such as 0.0001:1 can sometimes be used.

The polymerization can be effected over a wide range of temperatures, again the particular preferred temperature being chosen in accordance with the monomer, pressure, particular catalyst and other reaction variables. For many monomers from room temperature down to say −40° C. and even lower are suitable, and in many cases, it is preferred that the temperature be maintained at below about 35° C. However, for other monomers, particularly ethylene, higher temperatures appear to be optimum, say from 50 to 75° C. for ethylene. Temperatures ranging up to 100° C. and higher are generally satisfactory for Ziegler-type polymerization.

The pressure at which the polymerization is carried out is independent upon the chosen monomer or monomers, as well as other variables. In most instances, the polymerization is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like, although the extent to which a given quantity will inhibit catalyst activity will be greatly dependent on the particular material. For this reason, suitable precautions should be taken to protect the catalyst and the reaction mixture from such materials. An excess of the aluminum compound, particularly mole ratios of aluminum to titanium or zirconium in excess of about 4:1, tends to give a certain amount of protection against these poisons. The monomers and diluents or solvents, if used, need not be pure so long as they are reasonably free from poisons. It is well to protect the catalyst during preparation, storage, and use by blanketing with an inert gas, e.g., nitrogen, argon or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances the polymerization mixture can be allowed to remain quiescent while the polymerization takes place. In the case of the more rapid reactions with the more active catalyst, means can be provided for refluxing monomer and solvent if any of the latter is present, and thus remove the heat of reaction. In any event adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as, for example, by passing the reaction mixture through an elongated reaction tube which is contacted externally with suitable cooling medium to maintain desired reaction temperature, or by passing the reaction mixture through an equilibrium overflow reactor, or a series of the same.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture, or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a nonsolvent, such nonsolvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high-boiling solvent is used, it is usually desirable to finish any washing of the polymer with a low-boiling material, such as one of the lower aliphatic alcohols or hexane, pentane, etc., which aids removal of the higher boiling materials and permits the maximum removal of extraneous material during the final polymer drying step. Such step is desirably effected in a vacuum at moderate temperatures, preferably well below 100° C.

The foregoing principles and procedures can be applied, with suitable modifications when necessary, to reactions other than polymerizations, effected in the presence of Ziegler catalysts treated with surfactants in accordance with the present invention.

In order to illustrate some of the various aspects and advantages of the invention, the following examples are given. Ethylene has been chosen as a representative monomer, triisobutylaluminum has been chosen as a representative reducing agent in preparing the catalyst, titanium tetrachloride has been chosen as a representative polyvalent metal compound that is reduced in preparing the catalyst, kerosene has been chosen as a representative inert organic liquid for preparation of the catalyst dispersion and in which to carry out the polymerization, and the condensation product of dodecylphenol with 7.6 moles ethylene oxide (per mole of dodecyl phenol) has been chosen as a representative nonionic surfactant. It will, of course, be understood that variations from the particular catalyst components, reactants, surfactants, solvents, proportions, temperatures, and the like can be made without departing from the invention.

EXAMPLES

Activity of catalysts was determined by the rate at which ethylene was polymerized to high-molecular-weight, high-density polyethylene at standardized conditions. A tubular-type reactor about 3 inches in diameter and 500 ml. capacity was used. It was fitted with side arms for addition of liquids and withdrawal of gas, a thermometer well, and a paddle-type, hollow-stem, constant-speed stirrer. Gas was passed through an inlet flow meter into the stirrer shaft, and flowed out into the reaction mixture at the tip of the stirring blade. The off-gas was passed through a spiral condenser and a Dry-Ice (solid $CO_2$) trap to an outlet flow meter.

The apparatus was baked dry, assembled, and flushed with lamp-grade nitrogen. Passage of nitrogen was continued until the reaction temperature was attained. The calculated amount of catalyst was transferred with a pipette to the reactor, and enough kerosene was added to bring the volume to 250 ml. The kerosene used in the reaction vessel and in preparation of the catalyst had been highly purified by extensive acid washing and dried by distillation. Stirring was started and the mixture was heated to 65° C., heating was discontinued and the gas inlet was switched from nitrogen to ethylene. The inlet and outlet flow meters were read at 1-minute intervals. The reactor was cooled with air blast as needed to maintain a temperature of 65° C. plus or minus 2° C. A standard run time of 12 minutes was used throughout.

The ethylene flow was maintained at such a level that an appreciable excess of ethylene was always passing through the reactor. The difference in the flow meter readings was then plotted against time in minutes and the area under the curve was calculated by the method of counting squares. The direct relation between the area and the weight of polymer had been estabished from a large number of samples that had been worked up and weighed. Catalyst activity is reported as grams polymer per hour per liter of initial reaction mixture.

Catalyst was prepared as a slurry in kerosene in a 3-neck Morton flask well flushed with nitrogen by means of a nitrogen inlet and outlet and equipped with a high-speed stirrer assembly. The apparatus was first baked dry and flushed with lamp-grade nitrogen. Most of the kerosene to be used was then placed in the flask and the requisite quantity of triisobutylaluminum was added and washed into the flask with additional kerosene. The requisite quantity of $TiCl_4$ was then added dropwise over a 15-minute interval. The $TiCl_4$ addition funnel residue was then washed into the flask with the final quantity of kerosene. At the chosen time, the surfactant, which was the condensation product of dodecylphenol with 7.6 moles of ethylene oxide, was added dropwise to the vigorously agitated catalyst suspension. Catalyst was stored under nitrogen until used. When catalyst was to be tested, the catalyst slurry was well mixed and then by means of a pipette aliquots were transferred under nitrogen into the reactor.

In each instance, the catalyst components were employed in amounts to give an initial concentrated catalyst slurry containing 173 millimoles titanium per liter of kerosene, which when diluted in the polymerization reactor with additional kerosene gave a concentration of 13.8 millimoles titanium per liter of kerosene. The mole ratio of aluminum to titanium was 0.5.

Catalyst prepared as described above was tested for activity after storage at room temperature for various periods of time. Tests were made on the catalyst without surfactant (control), and on catalyst of the same age treated with from 0.12 to 0.18 g. of surfactant (per 250 ml. solution) immediately prior to the polymerization. The 250-ml. solutions employed in the tests contained 3.45 millimoles catalyst. Results are in Table I.

Table I

RESTORATION OF CATALYST ACTIVITY BY ADDITION OF SURFACTANT JUST BEFORE POLYMERIZATION

| Age of Catalyst | Ethylene Uptake, g./l./hr. | |
|---|---|---|
| | Without Surfactant | With Surfactant |
| 5 hours | 290 | 293 |
| 1 day | 247 | 314 |
| 1½ days | 261 | 316 |
| 3 days | 193 | 291 |
| 4 days | 109 | 234 |

Similar tests were made to determine the effect of adding the surfactant in the same quantities to the catalyst just 30 minutes after its initial preparation. Results are in Table II.

Table II

MAINTENANCE OF CATALYST ACTIVITY BY ADDITION OF SURFACTANT TO FRESH CATALYST

| Age of Catalyst | Ethylene Uptake, g./l./hr. | |
|---|---|---|
| | Without Surfactant | With Surfactant |
| 5 hours | 290 | 341 |
| 1½ days | *283 | *350 |
| 6 days | 31 | 251 |
| 3 weeks | Inactive | Inactive |

*Activity test run for 20 minutes.

That the surfactant ought to be practically anhydrous was shown by comparison of the extent of catalyst activation obtained with surfactant from the same bottle over a period of time. This surfactant (dodecylphenol-7.6 ethylene oxide) is a hygroscopic liquid and obviously absorbed some moisture from the air on each exposure. The data are in Table III.

Table III

EFFECT OF MOISTURE IN DISPERSANT ON CATALYST ACTIVATION

Bottle openings: Percent observed Activation
1 ———————————————————— +115
2 ———————————————————— + 50
3 ———————————————————— + 43
4 ———————————————————— + 21
5 ———————————————————— − 50
6 ———————————————————— − 83
7 [1] ———————————————————— + 54

[1] Surfactant dried in vacuum oven at 70° C. for 18 hours.

There is, of course, the possibility that very slight quantities of moisture are harmless, or even beneficial, but it is apparent from the above that increasing quantities of moisture cause a decrease in the amount of activation to be obtained.

That the surfactant must be added to the prepared catalyst, at least when triisobutylaluminum and $TiCl_4$ are used to prepare the catalyst, is shown by the results reported in Table IV.

Table IV
COMPARISON OF METHODS OF ADDING DISPERSANT

| Method of Adding Dispersant | $C_2H_4$ Uptake, g./l./hr. | | |
| --- | --- | --- | --- |
| | 4 hr. | 43 hr. | 5¾ days |
| A | 341 | 400 | 252 |
| B | 293 | 332 | 252 |
| C | Inactive | | |
| D | Inactive | | |

A. Dispersant added to catalyst complex ½ hour after preparation.
B. Dispersant added to catalyst complex just prior to run.
C. Dispersant added to $TiCl_4$ solution prior to addition to aluminum alkyl solution.
D. Dispersant added to aluminum alkyl solution prior to addition of $TiCl_4$ solution.

While the invention has been described with particular reference to various preferred embodiments thereof, it will be appreciated that variations from the details given herein can be effected without departing from the invention in its broadest aspects.

This application is a division of application Serial No. 703,766, filed Dec. 19, 1957, and now U.S. Patent No. 3,060,132.

What is claimed is:

1. A method which comprises polymerizing α-olefins containing 2 to 8 carbon atoms in the presence of a polymerization catalyst adapted for the low pressure polymerization of ethylenically unsaturated monomers comprising the reaction product of (a) a metal compound of the general formula $R_nMeX$ wherein Me is a first to third group metal, R is selected from the group consisting of alkyl, cycloalkyl and aryl radicals and X is selected from the group consisting of hydrogen, halogen, alkyl, cycloalkyl, and aryl radicals and n is a number which is lower by one than the valence of the metal Me with (b) a salt of a Group IV–B to VI–B metal, and a nonionic surfactant having an HLB value within the range of 2 to 20.

2. A method which comprises polymerizing ethylene over an aged trialkyl aluminum/titanium tetrachloride catalyst treated with 0.1 to 10% by weight of nonionic surfactant which is the product of the condensation of an alkylphenol with from 5 to 15 moles of ethylene oxide per mole of alkylphenol.

3. A method according to claim 2 wherein said monomer is ethylene.

4. A method according to claim 1 wherein said surfactant is a product of the condensation of an alkylphenol with ethylene oxide.

5. A method which comprises polymerizing an α-olefinic hydrocarbon of up to 8 carbon atoms over a catalyst comprising the reaction product of (a) an aluminum compound of the general formula $R_2AlX$, wherein R is selected from the group consisting of alkyl, cycloalkyl and aryl radicals and X is selected from the group consisting of hydrogen, halogen, alkyl, cycloalkyl, and aryl radicals with (b) a metal halide selected from the group consisting of the chlorides, bromides and iodides of titanium and zirconium, in proportions to give an atomic ratio of aluminum to the other metal between 0.3:1 and 5:1 and 0.1 to 10% by weight of the reaction product of a nonionic surfactant having an HLB value within the range of 2 to 20.

6. A method according to claim 5 in which the surfactant is the product of the condensation of an alkylphenol with from 5 to 10 moles of ethylene oxide per mole of alkylphenol.

No references cited.

UNITED STATES PATENT OFFICE
CERTIFICATE OF CORRECTION

Patent No. 3,159,615

December 1, 1964

Lloyd E. Weeks et al.

It is hereby certified that error appears in the above numbered patent requiring correction and that the said Letters Patent should read as corrected below.

Column 1, line 42, for '"planting"' read -- "plating" --; column 2, line 11, for "overcove" read -- overcome --; column 7, line 63, for "Ipepal" read -- Igepal --; column 14, Table III, under the heading "Percent observed Activation", and opposite "Bottle openings: 5", for "-50" read -- -18 --.

Signed and sealed this 6th day of April 1965.

(SEAL)
Attest:

ERNEST W. SWIDER
Attesting Officer

EDWARD J. BRENNER
Commissioner of Patents